United States Patent [19]

Ciolczyk et al.

[11] Patent Number: 5,042,783
[45] Date of Patent: Aug. 27, 1991

[54] RESILIENT SUPPORTS

[75] Inventors: Jean-Pierre Ciolczyk, Montargis; Jean-Michel Simon, Clamart, both of France

[73] Assignee: Hutchinson, Paris, France

[21] Appl. No.: 482,309

[22] Filed: Feb. 20, 1990

Related U.S. Application Data

[62] Division of Ser. No. 207,693, Jun. 16, 1988.

[30] Foreign Application Priority Data

Jun. 23, 1987 [FR] France .................. 87 08809
Nov. 24, 1987 [FR] France .................. 87 16240

[51] Int. Cl.⁵ .................................. F16F 3/10
[52] U.S. Cl. ................................ 267/81; 248/560; 248/628; 267/140.4; 267/148; 267/152; 267/160
[58] Field of Search ....... 267/136, 140.1, 140.3–140.5, 267/141.7, 152, 153, 160, 164, 292, 294, 148, 149, 158, 80, 81, 83, 47; 248/603, 604, 610, 613, 618, 621, 628, 630, 619, 591, 570, 560, 581, 634; 428/373–375, 382

[56] References Cited

U.S. PATENT DOCUMENTS

| | | | |
|---|---|---|---|
| 1,725,391 | 8/1929 | Brown | 248/610 |
| 3,243,338 | 3/1966 | Jackson | 428/373 X |
| 3,317,166 | 5/1967 | Janssen | 267/158 |
| 4,278,726 | 7/1981 | Wieme | 267/152 |
| 4,572,471 | 2/1986 | Schrepfer | 248/560 |
| 4,688,778 | 8/1987 | Woltron | 267/47 X |
| 4,772,044 | 9/1988 | Booher | 267/149 |
| 4,935,977 | 6/1990 | Yamada | 267/148 X |

FOREIGN PATENT DOCUMENTS

| | | | |
|---|---|---|---|
| 101235 | 2/1984 | European Pat. Off. | |
| 159946 | 10/1985 | European Pat. Off. | |
| 2716233 | 10/1978 | Fed. Rep. of Germany | 267/164 |
| 2089650 | 1/1972 | France | |
| 2275696 | 1/1976 | France | |
| 2545443 | 11/1984 | France | |
| 0054746 | 4/1982 | Japan | 267/158 |
| 0179543 | 9/1985 | Japan | 267/220 |
| 0155343 | 7/1987 | Japan | 267/140.4 |
| 8303647 | 10/1983 | PCT Int'l Appl. | |
| WO86/00051 | 1/1986 | PCT Int'l Appl. | |
| 984139 | 2/1965 | United Kingdom | |

*Primary Examiner*—Matthew C. Graham
*Assistant Examiner*—Peter M. Poon
*Attorney, Agent, or Firm*—Bell, Seltzer, Park & Gibson

[57] ABSTRACT

A resilient support is provided comprising an elastomer matrix symmetrical with respect to a given axis, a plurality of composite material cables embedded in this elastomer matrix and a plurality of fixing devices allowing the cables to be subjected to flexional forces in any one of three directions of a spatial axis reference system. In a preferred embodiment, the resilient support comprises a cross shaped matrix in the arms of which the cables are embedded and which comprises fixing devices formed by composite blade springs situated in the extension of each arm of the cross.

16 Claims, 6 Drawing Sheets

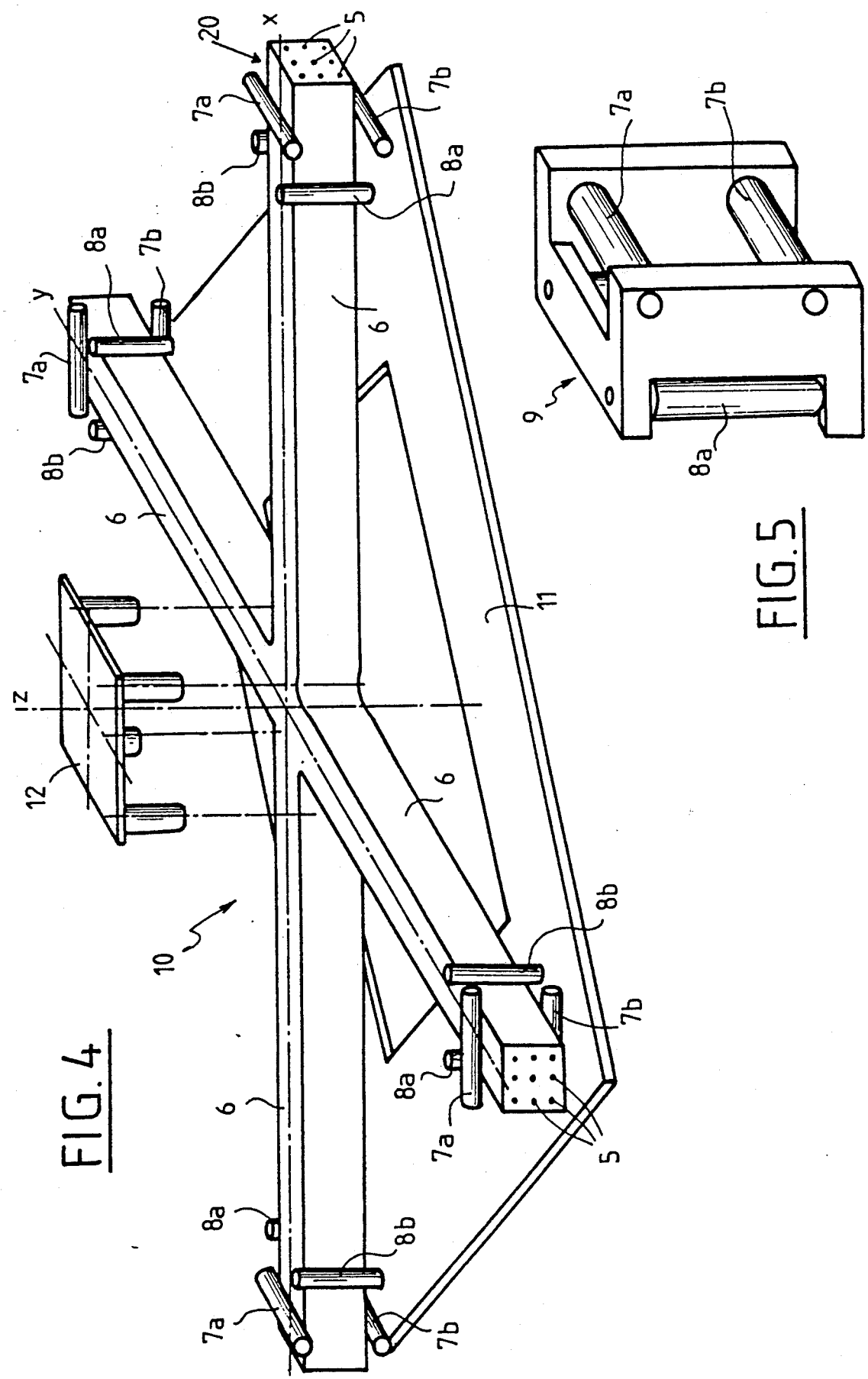

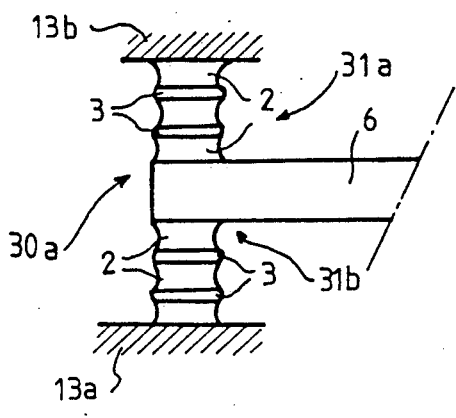
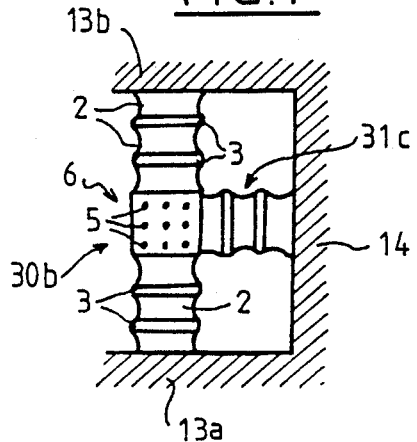
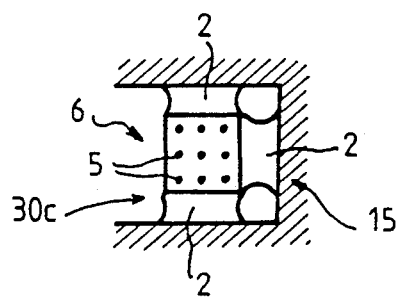
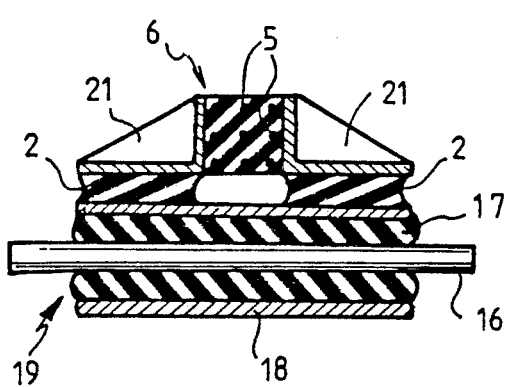
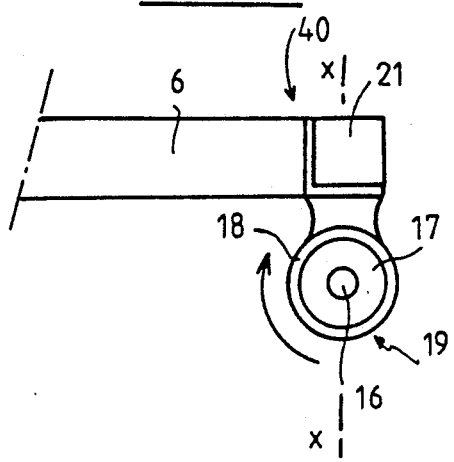

RESILIENT SUPPORTS

This is application is a divisional of application Ser. No. 07/207,693, filed on June 16, 1988.

BACKGROUND OF THE INVENTION

The present invention relates to resilient supports.

Resilient supports having a laminate structure are known, i.e. formed by a succession of alternate elastomer layers adhered to metal layers, normally made from steel.

Such a structure is intended especially to operate under shearing conditions, i.e. to be subjected to forces perpendicular to the stacking axis (or direction) formed by the superpositioning (or juxtapositioning) of the different layers (although the structure may also work under compression as well as under traction, but to a lesser extent).

However, a laminate structure support of the above type does not allow appreciable deflections to be obtained under a low load, for a given size: e.g. under a load of 1 to 10 daN, deflections of only 10 to 30 mm under shearing conditions are obtained.

Now, the need of resilient supports allowing appreciable deflection movements, under a low load and for a given size is felt in different technical fields, in particular, but in no way limitative, for protecting airborne electronic equipment in the case of accidental collisions or explosions: in fact, under these circumstances, it is necessary to have supports with not only a large ability to absorb shocks but also the ability to "accompany" or "follow" the shock wave.

As far as the above laminate structure supports are concerned, another drawback should be mentioned, in that their behavior is far from being isotropic with respect to the three orthogonal directions of a Certesian reference system; in particular, the behavior under compression/traction forces along the axis of the stack of alternate elastomer/metal layers is not comparable to the behavior under shearing forces along the two axes perpendicular to each other and to the axis of the stack in question, particularly because of the present of stiffness which is too high in this latter direction.

In addition, the drawback should be noted related to the presence of a buckling phenomenon of the metal layers.

SUMMARY OF THE INVENTION

The object of the present invention is to provide resilient supports satisfying the following requirements simultaneously:

provision of appreciable deflections, under low loads and for a given size;

absence of buckling;

substantially isotropic behavior in at least two directions of a spatial axis reference system.

Now, in the case of the present invention, it has been discovered that it is possible to achieve this object by using a plurality of rods (or cords or cables) made from a material which has a resilience substantially greater than that of steel, and formed particularly of composite materials, which are embedded in an elastomer matrix having a symmetric structure with respect to a given direction, allowing it to be subjected to flexional forces, whatever the spatial orientation of the force to which the support is subjected.

Another object of the invention is to provide a resilient support which, while satisfying the above requirements, has a substantially reduced stiffness when it is urged in any one of the directions of said spatial axis reference system.

More precisely the purpose of the present invention is to provide a resilient support characterized in that it comprises:

an elastomer matrix having a symmetric structure with respect to a given axis, a plurality of composite material cables embedded in this elastomer matrix, a plurality of devices for fixing the matrix, allowing said cable to be subjected to flexional forces in any one of the three directions of a spatial axis reference system, the symmetric structure of the matrix and the distribution of the cables therein being such that the behavior under flexion of the resilient support is substantially isotropic in at least two directions of said spatial axis reference system, whatever the direction of a force (or shock) acting on said resilient support in this reference system.

In fact, it should be noted that:

the fact of giving the elastomer matrix a symmetric structure, for working under flexion, conjointly with reinforcement means which are embedded therein, makes it possible to obtain appreciable deflections under low loads, for a given dimension, the factor of forming said reinforcement means from composite materials elminates buckling, the fact of forming these reinforcement means from composite materials, in the form of cables embedded in a matrix having a symmetric structure with respect to a given direction, allows the resilient support to be urged substantially isotropically in two directions perpendicular to the direction of symmetry.

In a first preferred embodiment of the resilient support of the invention, the elastomer matrix has a symmetric structure in the form of a cross with arms which are equal and perpendicular to each other and to the axis of symmetry of the matrix, their longitudinal axes being oriented in the other two directions of said reference system and said cables being embedded in the arms of the cross parallel to the axis thereof, a fixing device being provided at the lateral end of each arm providing a support for flexion in any one of the three directions of said reference system.

In an advantageous arrangement of this embodiment, each fixing device comprises a pair of rollers perpendicular both to said axis of symmetry and to the axis of the corresponding arm, as well as a pair of rollers parallel to the axis of symmetry and perpendicular to the axis of said corresponding arm, the rollers of each pair being fixed in a frame and spaced apart for supportingly and slidingly housing the end of this arm.

In another advantageous arrangement of this embodiment, each fixing device is formed by at least one device with laminate structure disposed on one side of the corresponding arm, at one end thereof, this laminate structure device having a plurality of alternate elastomer layers adhered to reinforcement layers, made from metal or a composite material, which layers are parallel to the axis of the corresponding arm and perpendicular to the axis of symmetry.

In a preferred adaptation of this arrangement, the end of each arm is provided with two laminate structure devices of said type, disposed on each side of said end.

In another preferred adaptation of said arrangement, each of the ends of said arms comprises three laminate structure devices of said type, two devices of which are disposed on each side of the end of the corresponding arm, with their axes aligned and their layers parallel to the axis of the corresponding arm, and perpendicular to the axis of symmetry, whereas the third device is disposed with its axis perpendicular to the common axis of the first two devices and with its layers parallel both to the axis of the corresponding arm and to the axis of symmetry.

In yet another advantageous arrangement of said embodiment, each fixing device is formed by at least one elastomer layer disposed on one side of the corresponding arm at one end thereof.

In a preferred variant of the fixing devices, they also comprise a means for adjusting the natural oscillation frequency of the resilient support.

In a preferred arrangement of this variant, the means for adjusting said frequency comprises a laminate structure with cylindrical layers formed by a central shaft and at least a succession of layers comprising a cylindrical elastomer layer (adhered to this shaft) and a cylindrical metal layer (adhered to this elastomer layer), the shaft being perpendicular to the axis of the corresponding arm and to the axis of symmetry, and being disposed on one side of the end of this arm and symmetrically with respect to a plane passing through the axis of this arm and the axis of symmetry, so as to extend on each side beyond the transverse dimension of said corresponding arm, said end being connected to the cylindrical laminate structure by two elastomer layers which are disposed on each side of the plane of symmetry (of this cylindrical laminate structure) and which are adhered to brackets, between which the end of the corresponding arm is imprisoned.

In a second advantageous embodiment of the resilient support of the invention the elastomer matrix has a square annular symmetric structure with diagonals, the composite material cables being embedded in each of the sides and in each of the diagonals of the matrix parallel to their corresponding axes, fixing devices being disposed in the median zone of the sides of the matrix.

Of course, said fixing devices allow the cables to be urged under flexion in any one of the three directions of a spatial axis reference system, two axes of which are defined by the axes of the diagonals, whereas the third axis is perpendicular thereto.

In a third preferred embodiment of the resilient support of the invention, the elastomer matrix has a symmetric structure in the form of a cross with arms equal and perpendicular to each other and to the axis of symmetry of the matrix, their longitudinal axes being oriented in the other two directions of said reference system and said cables being embedded in the arms of the cross parallel to the axis thereof, a fixing device being provided at the lateral end of each arm and forming a support under flexion in any one of the three directions of said reference system, each end fixing device being formed by at least one blade spring disposed on the extension of each arm of the matrix.

In a fourth advantageous embodiment of the resilient support of the invention—with is a variant of said third mode—the elastomer matrix is divided and comprises at least four separate arms in with said cables are embedded parallel to the longitudinal axis of these arms and one end of which is intended to be connected to a useful load to be supported, whereas the other end is connected to a fixing device formed by at least one blade spring disposed in the extension of the corresponding arm of the divided matrix, the four arms being oriented in twos along the other two directions of said reference system.

In an advantageous arrangement of these third and fourth embodiments, each blade spring has a configuration defined by a profile substantially in the form of an arc of a circumference or ellipse.

In another preferred arrangement of these third and fourth embodiments, each spring blade has a composite structure formed by at least one central layer sandwiched between two external layers, the central layer being possibly made from elastomer and the external layers from a composite material or vice versa.

In an advantageous adaptation of this arrangement, the matrix is made from an elastomer having a very low shock absorbing coefficient, whereas each blade comprises an elastomer having a relatively high shock absorbing coefficient.

Besides the above arrangements, the invention comprises yet other arrangements which will be clear from the following description.

BRIEF DESCRIPTION OF THE DRAWINGS

The invention will be better understood from the complement of description which follows with reference to the accompanying drawings in which:

FIG. 4 shows a preferred embodiment of the resilient support of the invention in the form of a cross with arms which are equal and perpendicular to each other;

FIGS. 5 to 8 shows variants of construction of a device for fixing the ends of the arms of the resilient support illustrated in FIG. 4;

FIG. 9 shows a side elevational view of a variant of construction of the device for fixing the arms of the cross shaped resilient support illustrated in FIG. 4, making it possible in addition—with respect to the variant shown in FIGS. 5 to 8—to adjust the natural oscillation frequency of the resilient support;

FIG. 10 is a view through plane X—X of FIG. 9;

It should however be understood that these drawings and the corresponding descriptive parts are given solely by way of illustration of the object of the invention, of which they in no way form a limitation.

DESCRIPTION OF THE PREFERRED EMBODIMENTS

Figure 1:
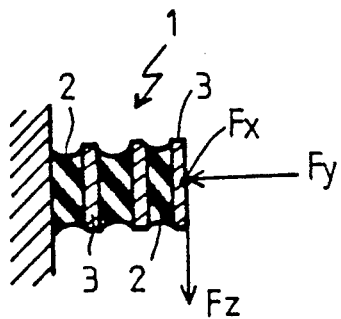
FIG. 1 shows a laminate structure resilient support of the prior art for working essentially under shearing forces and, to a lesser extent, under compression/traction forces.

FIG. 1 shows a prior art resilient support 1 having a laminate structure with a succession of alternate elastomer layers 2 adhered to metal layers 3. The references Fx, Fy and Fz represent the three components of any force applied, along three axes of a Cartesian reference system of orthogonal axes, to the free end of the resilient support 1.

It is clear that the components Fx and Fz urge this support under shearing forces, whereas component Fy urges it under compression although tractive forces are also able to act on this support, but to a lesser extent.

As already mentioned above, in the description of the prior art, a laminate structure support such as the one shown in FIG. 1 does not allow appreciable deflections to be obtained under low loads for a given size, and it has a non isotropic behavior, since the behavior under forces directed as shown by Fy, under compression/traction, is not the same as for forces directed along Fx and Fz, under shearing.

In addition, for the metal layers there exists the problem of buckling.

Starting from the state of the art formed by a laminate structure support such as described above, attempts could be made to obtain considerable deflections by causing it to work under flexion. The resilient support, having such a laminate structure, would thus have the configuration of a laminate beam, which would be urged under flexion in a direction perpendicular to the axis of the beam and to the plane of each layer, which forms it.

However, although the above mentioned problem of deflections is solved by such a laminate beam, the problem of buckling remains for deflections which are too great; similarly, it is easy to check that the behavior under flexional forces of such a laminate beam is not isotropic. In fact, although the behavior of this beam under flexion is satisfactory (apart from the problem of buckling), in a direction perpendicular to the axis of the beam and to the plane of the layers thereof, flexion is impossible along an axis perpendicular to the axis of the beam and parallel to the plane of said layers, because of the inertia of these metal layers (or plates) with respect to an axis parallel to the plane defined by each plate.

Figure 2:
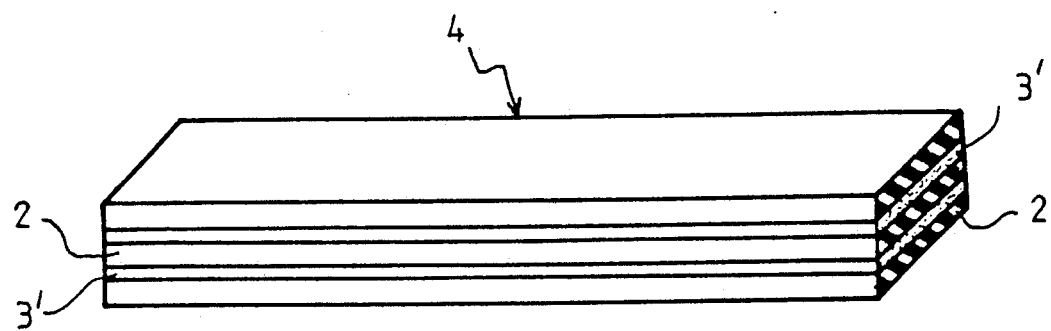
FIG. 2 shows a laminate structure resilient support whose configuration in the form of a laminate beam is able to be subjected to flexional forces.

The metal plates of the laminate beam could be replaced by plates 3' made from a composite material, so as to eliminate the above mentioned buckling problem, while taking into account the fact that the resilience of composite materials is much greater than that of steel (see FIG. 2 where the corresponding laminate beam 4 has been shown). However, the problem of the absence of isotropic behavior under flexion remains even for the laminate structure of FIG. 2.

Figure 3:
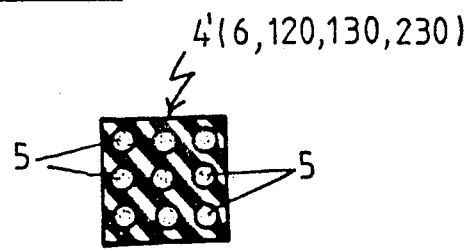
FIG. 3 illustrates the invention.

Within the terms of the present invention, it is proposed to replace the composite material plates 3' of the laminate beam of FIG. 2 by rods (or cords or cables) 5, shown in section in FIG. 3 and made from a composite material (such as glass/epoxy resin fibers or metal fibers embedded in an expoxy resin matrix), and distributed, for example, uniformly in the mass of beam 4' parallel to the axis thereof.

However, the fact of using only cords 5 only provides the desired isotropic behavior in two directions perpendicular to the axis of beam 4' of FIG. 3, but not along the axis of this beam, so that—still within the terms of the invention—since the cables 5 alone are not sufficient to achieve the object of the invention, they are caused to cooperate with an elastomer matrix having a special structure, namely symmetrical with respect to a given direction and able to be urged under flexion in a substantially isotropic way along the three directions of a Cartesian reference system of orthognal axes.

A preferred embodiment of the resilient support, which takes into account the preceding considerations, is shown in FIG. 4. The resilient support, for which the reference 10 has been used, comprises an elastomer matrix having a symmetric structure with respect to the axis of symmetry z, formed by a cross with equal arms 6 perpendicular to each other. In each arm 6 can be seen composite material cables 5 distributed uniformly in each arm 6 parallel to the axis of the corresponding arm.

At each of the ends of the arms of cross 10 is provided a device for fixing these arms, forming a support under flexion in any one of the three orthogonal directions of the Cartesian reference system defined by the axis of symmetry z and the axes x and y of arms 6 of cross 10, while allowing an appropiate degree of sliding of each arm along its axis, when a force acting on the resilient support 10 has a component oriented along the corresponding axis x or y.

This device 20 comprises a pair of rollers 7a, 7b perpendicular both to the axis of symmetry z and to the axis x or y of the corresponding arm, as well as a pair of rollers 8a, 8b parallel to the axis of symmetry z and perpendicular to the axis x or y of the corresponding arm. Rollers 7a, 7b of the first plant and the rollers 8a, 8b of the second pair are fixed in a frame 9 and are spaced apart for supportingly and slidingly housing the end of the corresponding arm 6.

Each device 50 for fixing the ends of the arms 6 of the cross shaped resilient support 10 is therefore intended to be fixed by means of its frame 9 (see FIG. 5: in FIG. 4 the devices 2 are shown, for the sake of simplicity, without their frame 9) to a square support plate 11 which has a central opening allowing deformation of the arms 6 of the resilient support 10 under the action of any force. The arms of the support are disposed along the diagonals of plate 11. In FIG. 4, the presence may also be noted of a support plate 12 for a device to be protected (not shown), formed for example by electronic equipment.

Of course, the rsilient support 10 is intended to be fixed by means of support plate 11 to any wall of any structure, particularly to a ceiling, a floor, vertical walls, as well as to a worktable or to furnishing equiptment in this structure.

FIG. 6 shows a constructional variant 30a of the fixing device 20 comprising two laminate structure devices 31a, 31b diposed with their axes aligned on each side of an arm 6 of the resilient support 10, which devices 31a, 31b include a plurality of alternate elastomer layers adhered to reinforcement layers which may be made from metal (see reference 3 in FIG. 1) or a composite material (see reference 3' in FIG. 2), which layers are parallel to the axis x or y of the corresponding arm and perpendicular to the axis of symmetry z.

The fixing device 30b shown in FIG. 7 differs from the device shown in FIG. 6 in that it also comprises a third laminate structure device 31c disposed perpendicularly to the common axis of devices 31a, 31b, with its layers 2 and 3 parallel both to the axis x or y of the corresponding arm and to the axis of symmetry z of the resilient support 10.

The device 30c shown in FIG. 8 differs from that of FIG. 7 in that the laminate structure devices 31a, 31b, 31c are replaced essentially by elastomer layers 2 adhered to an appropriate frame 15 (references 13a, 13b in FIG. 6 as well as the additional reference 14 in FIG. 7 indicate the frames to which the devices 31a, 31b, 31c are fixed).

Of course, at each of the lateral ends of arms 6 a single laminate structure device, such as 31a, could be used; similarly, in so far as FIG. 8 is concerned, two elastomer layers could be used or even a single elastomer layer instead of the three layers shown.

FIG. 9 shows a constructional variant 40 of the device for fixing the ends of the arms 6 of the resilient support 10 of the invention making it possible in addition to adjust the natural oscillation frequency of the resilient support 10, while preventing it from reaching the resonance frequency.

The fixing device 40 comprises a laminate structure 19 with cylindrical layers formed by a central shaft 16, a cylindrical elastomer layer 17 and a cylindrical metal layer 18, shaft 16 being perpendicular to the axis x or y of the corresponding arm and to the axis of symmetry z.

FIG. 10, which is a sectional view through the plane X—X of FIG. 9, shows that the cylindrical laminate structure 19 is disposed symmetrically with respect to the plane passing through the axis x or y of each arm 6 and the axis of symmetry z, so as to extend, on each side of this plane, beyond the transverse dimension of each arm 6. This latter is connected to the cylindrical laminate structure 19, more particularly to the cylindrical metal layer 18, by means of two elastomer layers 2 which are disposed symmetrically with respect to the plane of symmetry of structure 19 and which are parallel to the axis x or y of the corresponding arm 6 and perpendicular to the axis of symmetry z.

Each layer 2 is connected to the end of an arm 6 by means of two brackets 21 between which this end is imprisoned (adhered).

It is clear that, for the symmetric structure of the elastomer matrix shown in FIG. 4, a configuration may be adopted different from a cross 10 having equal arms perpendicular to each other, provided that the structure is able, in accordance with the invention, to be subjected to flexional forces in any direction of a spatial Cartesian reference system of orthogonal axes, and this in a substantially isotropic way for at least two directions of this reference system. In particular, a structure may be readily imagined in the form of a star with equal spikes, in which the composite material cables 5 are embedded parallel to the corresponding axis. Similarly, a configuration may be adopted in the form of a disk in which said cables 5 are embedded and disposed in different planes and (in each plane) in the form of a star. Similarly, adjustment of the natural oscillation frequency of the resilient support of the invention may be obtained by adopting a device for nipping the ends of the arms 6 of the cross shaped structure 10 obtained more particularly from the configuration illustrated in FIG. 6, in which one of the two laminate structure devices 31a or 31b, instead of being fixed, is able to be subjected to the action for example of a hydraulic cylinder providing a compression intended to slow down the sliding movement of the corresponding arm 6.

Furthermore, account may be taken of the fact that for a given force (load), particularly of unitary value, the deflection (or deformation) of each arm of cross 10 depends on several parameters, such as:

the modulus of flexion of the composite material cables, the diameter of these cables, the number of these same cables, the area of the section of the elastomer matrix defined by the cables disposed at the outermost part in this matrix, the shearing modulus of the elastomer matrix, the distance between the supports under flexion so as to adapt the performances of the resilient support of the invention to the requirements imposed by different specifications.

In addition, it is clear that the composition of the composite materials which can be used within the scope of the present invention is not limitative: generally, reinforced thermosetting and reinforced thermoplastic composite materials may be used.

Figure 11:
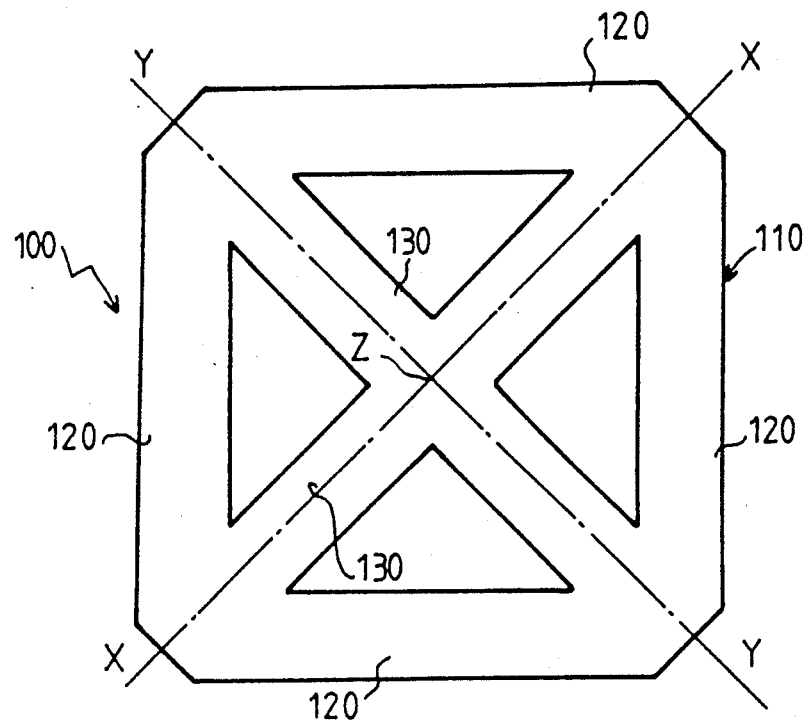
FIG. 11 is a top view of a second embodiment of the resilient support of the invention.
Figure 12:
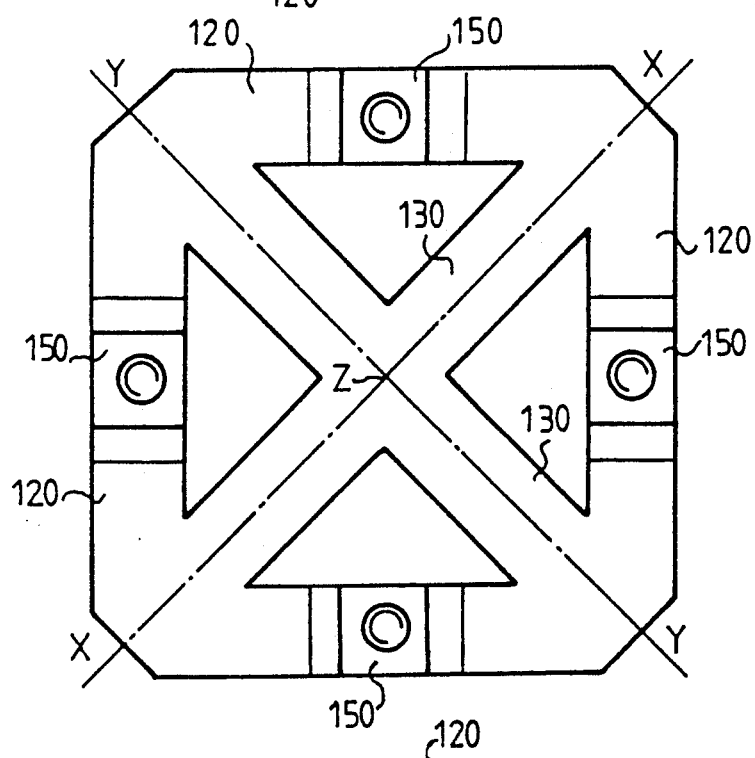
FIG. 12 is a bottom view of the support shown in FIG. 11.
Figure 13:
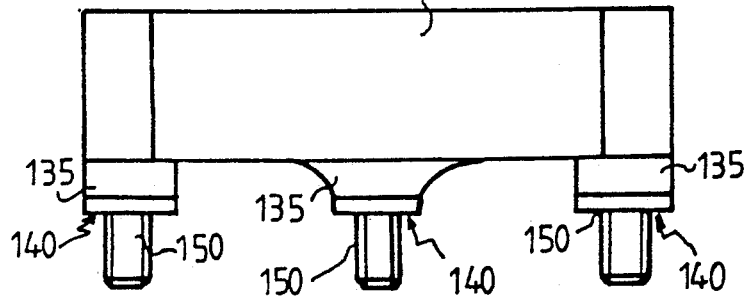
FIG. 13 is a side elevational view of the support illustrated in FIGS. 11 and 12.

FIGS. 11 to 13 illustrate a resilient support 100 whose behavior under flexion is substantially isotropic in two directions of an orthogonal axis reference system (which will be defined hereafter), whatever the direction of a force acting on the support in this reference system.

This support comprises:

an elastomer matrix 110 having a flattened symmetric structure in the form of a square ring, with lopped (or truncated corners), with its four sides 110 and its two diagonals 130, a plurality of composite material cables embedded uniformly in sides 120 and the diagonals of the elastomer matrix 110, like cables 5 illustrated in FIG. 3, a plurality of fixing devices 140 allowing an appropriate degree of sliding of each diagonal of the matrix, when the force has a component along the corresponding diagonal, while offering a support under flexion in any one of the three directions of said reference system.

The orthogonal axis reference system is defined by an axis z which is the axis of symmetry of the square elastomer matrix 110 perpendicular to the plane thereof, and two axes x and y which are the axes of symmetry of the diagonals 130 of said matrix.

The symmetric structure of the elastomer matrix 110 of the resilient support of the invention may be redefined as a cross with arms 130 equal and perpendicular to each other whose ends are connected by segments defining the sides of a square, whose diagonals 130 are formed by the two arms of said cross.

The fixing devices 140 illustrated in FIGS. 12 and 13 comprise an elastomer layer 135 disposed in the lower part and in the median part of the sides 120 of matrix 110. Each elastomer layer 135 is adhered both to the corresponding side of the matrix and to a block 150 intended to be fixed to a square plate supporting the assembly (which may be of the type defined by reference 11 in FIG. 4, this plate having a central opening allowing deformation of the diagonals 130 of the resilient support 100 under the action of any force).

It goes without saying that the fixing devices may be made in accordance with any of the other structures illustrated in FIGS. 6 to 8. Similarly, the devices for fixing the resilient support 100 may be equipped with means for adjusting its natural oscillation frequency, as illustrated in FIGS. 9 and 10.

Since cables 5—which are distributed in the elastomer mass of sides 120 and diagonals 130 of matrix 110 parallel to the axes thereof—are independent, it is advantageous to secure these cables at their convergent ends by means of two plates, made for example from metal, adhered to the lower and upper faces (portions) of the elastomer matrix, in the zone where each diagonal 130 crosses the corresponding convergent sides 120: thus it is possible to ensure cooperation of cables 5 at their convergent ends and so the continuity in the transmission of forces.

Figure 14A:
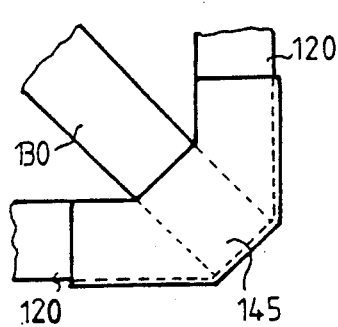
FIGS. 14a to 14c show variants of constructional details of the juctions between a diagonal of the matrix and the sides thereof.
Figure 14B:
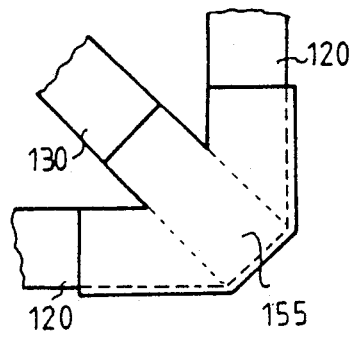
Figure 14C:
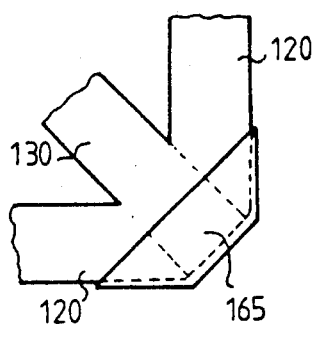

FIGS. 14a to 14c show variants 145, 155 and 165 for the configuration of each fixing plate, which differ essentially in the extent of the fixing zone which may concern the whole (cf FIG. 14a) or a part (cf FIG. 14c) of the zone where sides 120 intersect with each diagonal 130, or which may partially extend over this diagonal (see FIG. 14b).

The presence of the fixing plates 145, 155 or 165 may be used for suspending from each corner of matrix 110 a metal mass of appropriate weight (not shown, but which may be made from any other material) forming an efficient means for adjusting the natural oscillation frequency of the resilient support 100.

Of course, a plate (not shown, but which may for example be of the type defined by the reference 12 in FIG. 4)—which is intended to support a device to be protected, formed more particularly by airborne electronic equipment—may be secured in the zone where the diagonals 130 of the elastomer matrix 110 intersect.

It is easy to check that the resilient support shown in FIGS. 11 to 14 satisfies simultaneously the following requirements, which the support illustrated in FIG. 4 also satisfies:

the provision of appreciable deflections, under a low load and for a given dimension,
absence of buckling, and
substantially isotropic behavior in the two directions x and y of said reference system of orthogonal axes x, y, z, as well as the following requirement which consists in
a substantially lower stiffness in any one of the three directions of thee reference system of axes x, y, z with respect to the cross shaped structure of the above described elastomer matrix.

This reduction of stiffness is due to the fact that the fixing devices 140 are not disposed in the end zones of diagonals 130 contrary to the solution adopted in the case where the elastomer matrix has the configuration of a simple cross with arms equal and perpendicular to each other, corresponding to the diagonals of the square structure shown in FIGS. 11 and 12, but outside these zones so as to increase the flexibility of the diagonals. This condition is made possible through the presence of the sides 120 of the square matrix 110 which make it possible to place said fixing devices 140 in the median zones of sides 120: thus, a great flexibility is obtained —in any one of the directions of said reference system—in so far as the diagonals are concerned and an additional flexibility corresponding to the half lengths of sides 120 connecting the ends of each diagonal 130 to the fixing devices 140.

Although the fixing devices 140 allowing cables 5 to be subjected to flexional forces (cables embedded more particularly in the diagonals 130 of the elastomer matrix 110)—along any one of the three directions x, y and z of a Cartesian reference system, whose two directions x, and y are defined by the axes of the two diagonals whereas the third direction z is perpendicular to the plane defined thereby—have been shown as devices allowing a degree of sliding of each diagonal 130 along the corresponding axis x or y (these devices being replaceable by any variant illustrated in FIGS. 6 to 8), it will be readily understood that these fixing devices may be formed essentially by devices providing solely a support without sliding, since a degree of "intrinsic sliding" is provided by the flexibility of the semi-arms 120 connecting the ends of diagonals 130 to the devices themselves.

The fact of forming these latter with the possibility of sliding is therefore optional and only serves to increase the degree of "intrinsic sliding" such as defined above.

Furthermore, although in FIG. 3 cables 5 are shown as being distributed in the section of each segment of the elastomer matrix so that two consecutive cables have the same mutual spacing in the two directions parallel to the sides of said section, it is possible to imagine a different distribution. In particular, it may be advantageous for two consecutive cables, which follow each other in a first direction which is contained in a transverse plane perpendicular to the cables and which is perpendicular to a longitudinal plane orthogonal to said transverse plane, to have a mutual spacing which is different with respect to the spacing existing between two consecutive cables which follow each other in a second direction, which is contained in the same transverse plane and which is perpendicular to said first direction, such distribution of the cables allowing the flexional rigidity to be adjusted in any one of the three directions of said reference system, to preset values.

Figure 15:
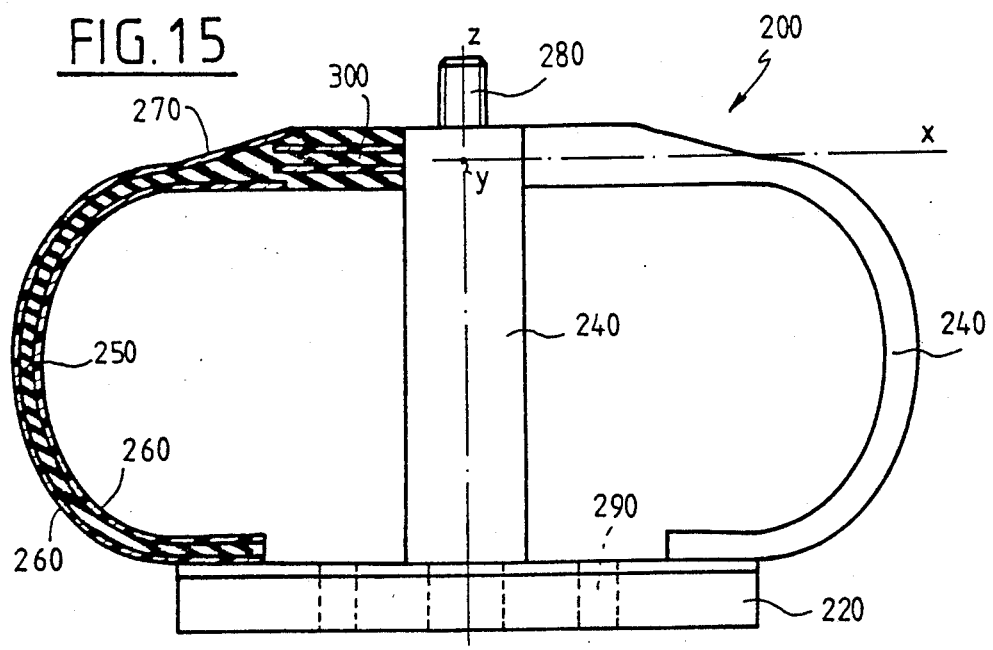
FIG. 15 is an elevational view in partial section of a third embodiment of the resilient support of the invention.
Figure 16:
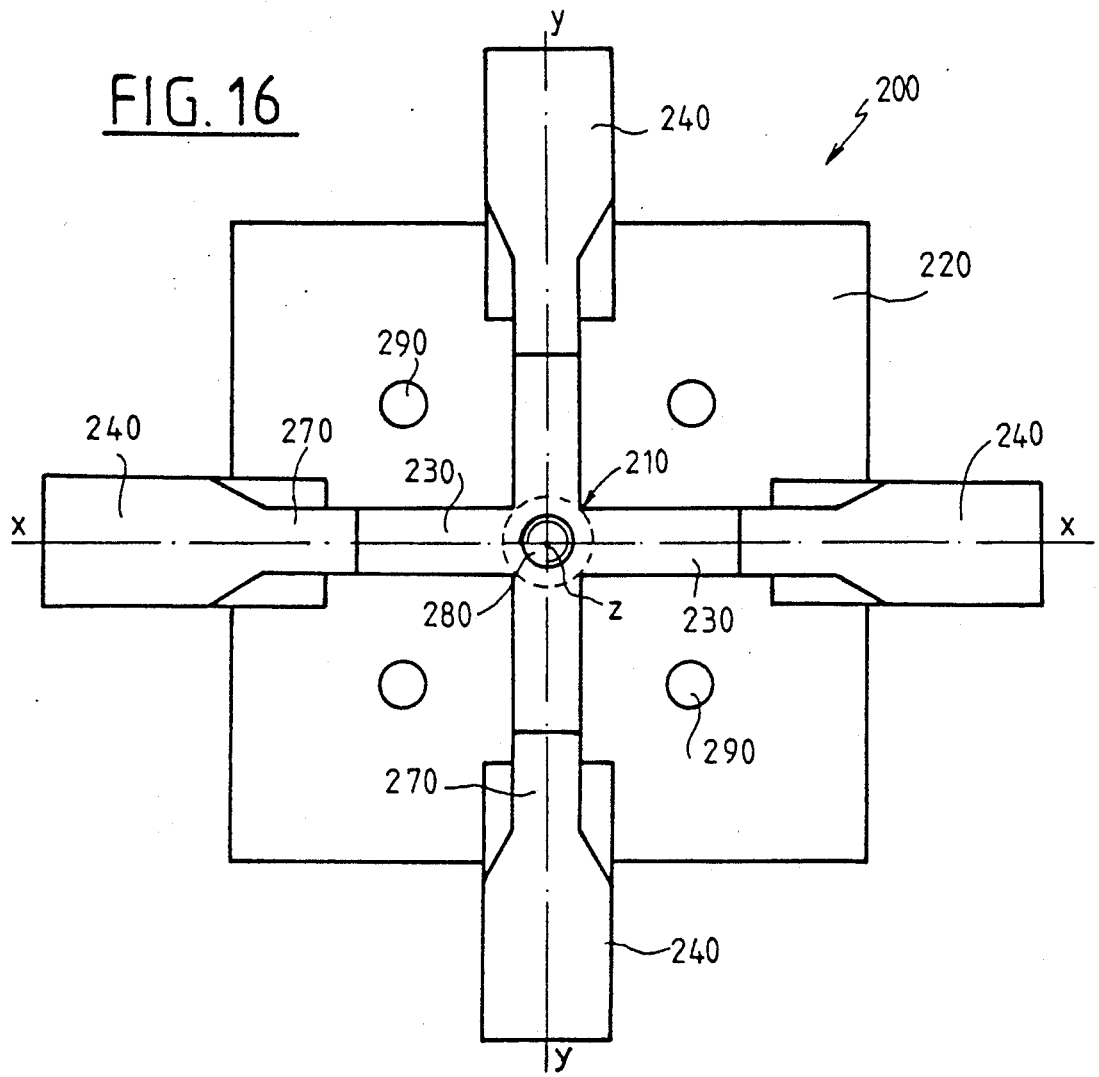
FIG. 16 is a top view of the resilient support illustrated in FIG. 15.
Figure 17:
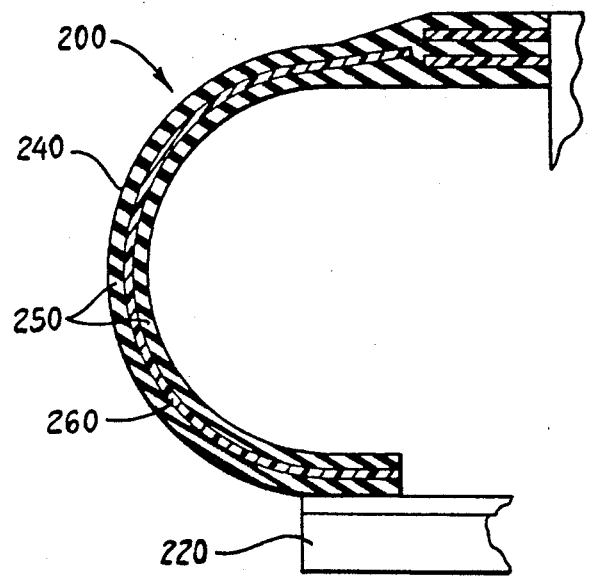
FIG. 17 is a fragmentary elevational view in partial section similar to FIG. 15 illustrating a variation of the third embodiment of the invention.

FIGS. 15 and 16 illustrate a resilient support 200 which comprises:
an elastomer matrix 210 in the form of a cross (like the one illustrated in FIG. 4),
a plurality of composite material cables 300 embedded in the arms 230 of the cross 210 (like cables 5 illustrated in FIG. 3),
a plurality of fixing devices 240 each formed of a blade spring disposed at each end of an arm 230 in the extension thereof and having substantially the configuration of the arc of a circumference as shown in FIG. 17 or an ellipse as shown in FIG. 15. Of course, this configuration of the blades of the springs is not limitative and others, for example in the shape of an S, may be adopted: furthermore, several configurations of the same type or of different types may be combined together for each spring by superimposing them.

The lower ends of each blade spring 240 are fixed to a plate 220 which, in its turn, is intended to be fixed to the wall of an appropriate structure, such as mentioned above, particularly be means of bolts (not shown) passing through the orifices 290.

A preferred structure of each blade 240 is that shown in section in FIG. 15. A web 250 can be seen formed by an elastomer layer sandwiched between two external layers 260 made from a composite material such as glass fibers/epoxy resin for example.

A variant of this preferred structure as seen in FIG. 17 consists in forming the central layer 260 from a composite material and the external layers 250 from elastomer.

In each case, cables 5 may advantageously extend slightly at the ends of arms 230 of cross 210 into the central layer of the blades of the corresponding fixing springs 240.

It may be noted in FIG. 15 that each blade 240 is connected to the corresponding arm 230 by a connecting portion 270 making it possible both to pass gradually from the thickness of the arm to that of the blade and to give to this latter the most appropriate width: in FIG. 16 it can be seen that this width is substantially greater than that of the arms of the cross.

In the center of cross 210 is disposed a block 280 which projects in the direction of axis z (axes x and y of the orthogonal axis reference system being formed by the longitudinal axes of the arms 230) and which is intended to receive the useful load to be supported.

Since it is normally desirable to provide the smallest dynamic rigidification of a resilient support, it is advantageous to use for support 200 an elastomer having a very low damping coefficient, for example formed by natural rubber.

However, in some applications there is the risk of resonance with the vibrations imposed by the dynamic load.

To reconcile these two contradictory requirements, it is recommended to limit the use of an elastomer with very low damping coefficient only to the matrix 210 of support 200 (such as defined by the reference 300 in FIG. 5), whereas for the blades 240 of each composite spring for fixing the matrix it is preferable to use an elastomer 250 having a relatively high damping coefficient.

In some applications, particularly when the dimensions of the useful load to be supported are relatively large, in order to prevent this load from abutting against the blades of the fixing springs, it is preferable to form the resilient support 200 so as to separate each of the four arms 230 of the matrix 210—jointly with the corresponding spring 240—with respect to the other arm/spring pairs (this variant is not shown because it follows immediately from that corresponding to FIGS. 15 and 16).

The ends of these arms of the thus divided matrix, with their springs, are intended to be connected to four ends of the load to be supported. Of course, the four arm/spring pairs thus defined are oriented in twos in the directions x, y of said reference system (x, y, z). That may be obtained in two ways, either by disposing the four arm/spring pairs in an X, along two diagonals (and at the end of these diagonals) of a base carrying the equipment to be supported forming the useful load, or by disposing the four arm/spring pairs in a cross, the axis of each pair being disposed parallel to a side of said base for space reasons.

In each case, the resilient support whose elastomer matrix is fixed by blade springs has the following properties:

low stiffness along the axis z, with the possibility of large deflections, transverse stiffness, namely along the axes x and y, also low because of the cooperation of the arms of the cross subjected to flexional forces with the end springs which wind up and unwind under the action of the dynamic load, this transverse stiffness being substantially isotropic along the two axes x and y, low dynamic rigidification because of the low damping coefficient of the elastomer used in the cross shaped matrix and because of the choice of an elastomer with a relatively high damping coefficient in the blades of the springs, this choice resulting in the "mechanical beat" effect of each composite spring being without prejudice for the dynamic stiffness, because it damps it.

As follows from the foregoing, the invention is in no way limited to those of its embodiments and modes of application which have been more explicitly described; it embraces, on the contrary, all variants thereof which may occur to a technician skilled in the art, without departing from the scope and spirit of the present invention.

What is claimed is:

1. A resilient support for machinery and equipment, which is characterized by the ability to deflect isotropically in at least two axes and absorb shock, said support comprising:

an elastomer matrix having a symmetric structure in the form of a square ring with sides and diagonals, said diagonals defining arms extending symmetrically outwardly from a central axis of symmetry, each arm having a symmetric structure with respect to the longitudinal axis of the arm, a plurality of composite material cables embedded in each of the sides and in each of the diagonals of the elastomer matrix parallel to their corresponding axes, and a fixing device cooperating with a medial zone of each of the sides of the elastomer matrix for connecting the elastomeric matrix to a support structure.

2. The resilient support as claimed in claim 1, wherein the zones in which each diagonal of said square ring shaped matrix intersects the sides of the matrix are equipped at the lower and upper parts with plates for fixing the convergent ends of the cables embedded in the diagonals and in said sides, said plates being adhered to the elastomer matrix.

3. The resilient support as claimed in claim 1, wherein each fixing device comprises a pair of rollers perpendicular both to said axis of symmetry and to the axis of the corresponding arm as well as a pair of rollers parallel to the axis of symmetry and perpendicular to the axis of said corresponding arm, the rollers of each pair being fixed in a frame and spaced apart for supportingly and slidingly housing the end of this arm.

4. The resilient support as claimed in claim 1, wherein each fixing device comprises at least one laminate structure disposed on one side of the corresponding arm, at one end thereof, this laminate structure device including a plurality of alternate elastomer layers adhered to reinforcement layers, which layers are parallel to the axis of the corresponding arm and perpendicular to the axis of symmetry, each laminate structure device being fixed to a frame.

5. The resilient support as claimed in claim 1, wherein each fixing device is formed by at least one elastomer layer disposed on one side of the corresponding arm at one end thereof.

6. The resilient support as claimed in claim 5, wherein the end of each arm is provided with two elastomer layers parallel to the axis of the corresponding arm and perpendicular to the axis of symmetry, which layers are fixed to a frame.

7. The resilient support as claimed in claim 5, wherein the end of each arm is provided with three elastomer layers two of which are disposed parallel to the axis of the corresponding arm and perpendicular to the axis of symmetry on each side of the end of said corresponding arm, with their axes aligned, whereas the third layer is disposed parallel both to the axis of the corresponding arm and to the axis of symmetry, with its axis perpendicular to the common axis of the first two layers.

8. The resilient support according to claim 1, wherein said arms are perpendicular to each other and to said central axis of symmetry.

9. A resilient support for machinery and equipment, which is characterized by the ability to deflect isotropically in at least two axes and absorb shock, said support comprising:
an elastomer matrix in the form of a plurality of arms extending symmetrically outwardly from a central axis of symmetry, each arm having a symmetric structure with respect to the longitudinal axis of the arm,
a plurality of composite material cables embedded in this elastomer matrix parallel to the longitudinal axis thereof, wherein two consecutive cables, following each other in a first direction,—which is contained in a transverse plane perpendicular to the cables and which is perpendicular to an orthogonal longitudinal plane with respect to said transverse plane—, have a mutual spacing which is different with respect to the spacing existing between two consecutive cables following each other in a second direction, which is contained in the same transverse plane and which is perpendicular to said first direction, this distribution of the cables allowing the flexional rigidity to be adjusted in any one of the three directions of said reference system to preset values, and
a fixing device cooperating with outward end portions of each of said arms for connecting the arms to a support structure.

10. A resilient support for machinery and equipment, which is characterized by the ability to deflect isotropically in at least two axes and absorb shock, said support comprising:
an elastomer matrix in the form of a plurality of arms extending symmetrically outwardly from a central axis of symmetry, each arm having a symmetric structure with respect to the longitudinal axis of the arm,
a plurality of composite material cables embedded in this elastomer matrix parallel to the longitudinal axis thereof, and
a fixing device cooperating with outward end portions of each of said arms for connecting the arms to a support structure, wherein said fixing device also comprises a means for adjusting the natural oscillation frequency of the resilient support.

11. The resilient support as claimed in claim 10, wherein the means for adjusting the natural oscillation frequency of the resilient support comprises a laminate structure with cylindrical layers formed by a central shaft and at least a succession of layers comprising a cylindrical elastomer layer adhered to the shaft and a cylindrical metal layer adhered to this elastomer layer, the shaft being perpendicular to the axis of the corresponding arm and being disposed on one side of the end of the corresponding arm and symmetrically with respect to a plane passing through the axis of this arm and the axis of symmetry, so as to extend on each side beyond the transverse dimension of the corresponding arm, whose end is connected to the cylindrical laminate structure by two elastomer layers which are disposed on each side of said plane of symmetry of this cylindrical laminate structure and which are adhered to brackets, between which the end of the corresponding arm is imprisoned.

12. A resilient support for machinery and equipment, which is characterized by the ability to deflect isotropically in at least two axes and absorb shock, said support comprising:
an elastomer matrix in the form of a plurality of arms extending symmetrically outwardly from a central axis of symmetry, each arm having a symmetric structure with respect to the longitudinal axis of the arm,
a plurality of composite material cables embedded in this elastomer matrix parallel to the longitudinal axis thereof, and
a fixing device cooperating with outward end portions of each of said arms for connecting the arms to a support structure, and masses of appropriate weight disposed at the four corners of the elastomer matrix for adjusting the natural oscillation frequency of the resilient support.

13. A resilient support for machinery and equipment which is characterized by the ability to deflect isotropically in at least two axes and absorb shock, said support comprising:
a plurality of arms extending symmetrically outwardly from a central axis of symmetry, the outward extend of each arm lying in a substantially common plane, and each arm being formed of an elastomer material and including a plurality of composite cables embedded within the elastomer material and extending parallel to the longitudinal axis of the arm along the outward extent of the arm;
a plurality of side members extending between and cooperating with outward end portions of adjacent pairs of said arms, each side member being formed of an elastomer material and including a plurality of composite cables embedded within the elastomer material and extending parallel to the longitudinal axis of the side member; and
a fixing device carried by each of said side members for connecting the resilient support to a support structure.

14. A resilient support for machinery and equipment which is characterized by the ability to deflect isotropically in at least two axes and absorb shock, said support comprising:
a plurality of arms extending symmetrically outwardly from a central axis of symmetry, the outward extend of each arm lying in a substantially common plane, and each arm being formed of an elastomer material and including a plurality of composite cables embedded within the elastomer material and extending parallel to the longitudinal axis of the arm along the outward extent of the arm; and
a fixing device cooperating with outward end portions of each of said arms for connecting the resilient support to a support structure, and said fixing device including means for adjusting the natural oscillation frequency of the resilient support.

15. A resilient support for machinery and equipment, which is characterized by the ability to deflect isotropically in at least two axes and absorb shock, said support comprising:
an elastomer matrix in the form of a plurality of arms extending symmetrically outwardly from a central axis of symmetry, each arm having a symmetric structure with respect to the longitudinal axis of the arm, a plurality of composite material cables embedded in this elastomer matrix parallel to the longitudinal axis thereof, and a fixing device cooperating with outward end portions of each of said arms for connecting the arms to a support structure, said fixing device comprising two laminate structures disposed on opposite sides of the corresponding arm at one end thereof, each laminate structure including a plurality of alternate elastomer layers adhered to reinforcement layers, which layers are parallel to the axis of the corresponding arm and perpendicular to the axis of symmetry, and each laminate structure being fixed to a frame.

16. A resilient support for machinery and equipment, which is characterized by the ability to deflect isotropically in at least two axes and absorb shock, said support comprising:

an elastomer matrix in the form of a plurality of arms extending symmetrically outwardly from a central axis of symmetry, each arm having a symmetric structure with respect to the longitudinal axis of the arm, a plurality of composite material cables embedded in this elastomer matrix parallel to the longitudinal axis thereof, and a fixing device cooperating with outward end portions of each of said arms for connecting the arms to a support structure, said fixing device comprising three laminate structures disposed at the end of each arm, with each such laminate structure including a plurality of alternate elastomer layers adhered to reinforcement layers, with each laminate structure being fixed to a frame, two of said laminate structures being disposed on opposite sides of the end of the arm, with the layers thereof parallel to the axis of the corresponding arm and perpendicular to the axis of symmetry, and the third said laminate structure being disposed with its axis perpendicular to the common axis of the first two devices and with its layers parallel both to the axis of the corresponding arm and to the axis of symmetry.

* * * * *